Sept. 3, 1946.  S. HAMILTON  2,407,077
SPEED INDICATOR TRANSMISSION
Filed Oct. 9, 1944  2 Sheets-Sheet 1

Inventor:
Sam Hamilton
By Pierce & Scheffler
his Attorneys.

Sept. 3, 1946.                S. HAMILTON                2,407,077
SPEED INDICATOR TRANSMISSION
Filed Oct. 9, 1944                          2 Sheets-Sheet 2
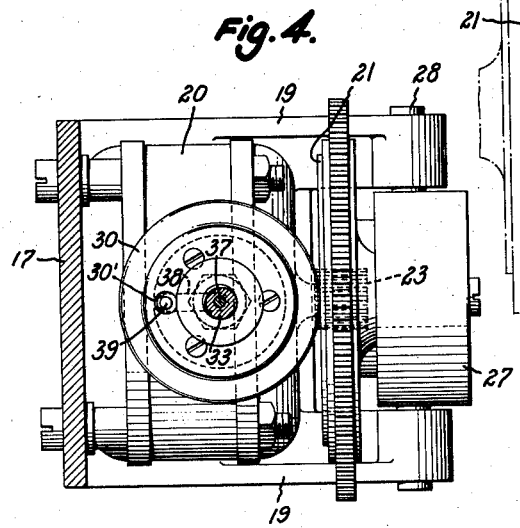
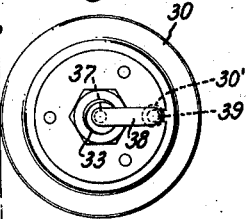
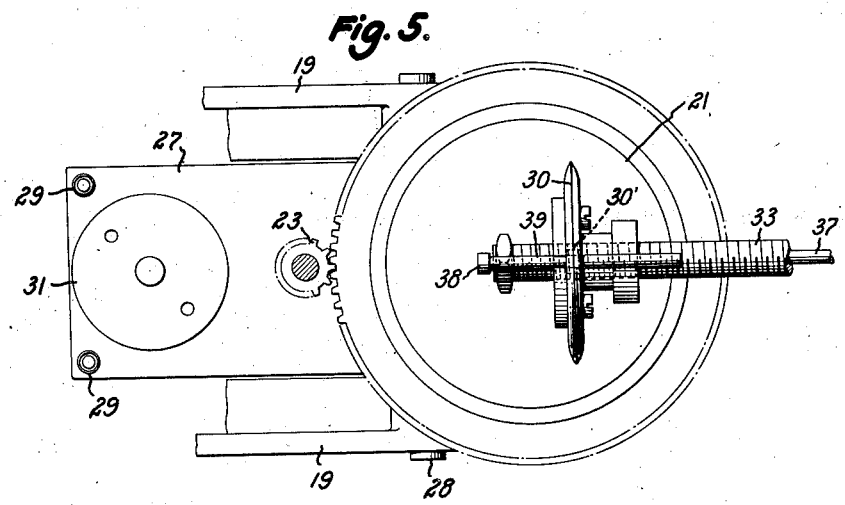
Inventor:
Sam Hamilton
By Pierce + Scheffler
his Attorneys.

Patented Sept. 3, 1946

2,407,077

UNITED STATES PATENT OFFICE 2,407,077

SPEED INDICATOR TRANSMISSION

Sam Hamilton, Ardmore, Pa., assignor to The Electric Tachometer Corporation, Philadelphia, Pa., a corporation of Delaware Application October 9, 1944, Serial No. 557,855

9 Claims. (Cl. 74—281)

This invention relates to motion and power transmitting apparatus of the wheel and disc type. An apparatus of this type embodied in a speed indicator is described in U. S. Patent No. 2,059,118. In the apparatus of this patent a disc 11 is rotated on its fixed axis at a constant speed and the screw shaft 1, carrying the wheel 5, is rotated on its fixed axis at the speed to be measured and the resultant longitudinal movement of the wheel 5 along the shaft 1 is transmitted through the sleeve 6, rack 8 and pinion 9 to the needle 10 on the dial 10' and translated into a speed indication.

An object of the present invention is to improve such apparatus by providing mechanism which is more economical in the transmission of the power delivered to the wheel from the disc through their frictional contact and which will be more accurate in the transmission of the motion of said wheel.

More particularly, an object of my invention is to eliminate the rotation of the screw shaft and thereby to eliminate the transmission of the motion of the wheel through mechanism of the type of parts 6, 8 and 9 of said patent. I have found that these results may be accomplished by substituting the rotary motion of the screw shaft by a corresponding revolution of the disc around the screw shaft, i. e. by mounting the disc and its driving motor for revolution about the axis of the screw shaft, thereby leaving the screw shaft stationary and making possible the direct use of the movement of the wheel on the screw shaft to indicate the speed to be measured or for other purposes. In this way, not only can the means for transmitting the motion of the wheel to a speed indicator be simplified with respect to the efficiency of the power transmission, but the utility of the mechanism may be improved in other respects such as with respect to lost motion, thereby making the readings more nearly accurate, and the movement of the pointer may be multiplied to produce indications that can be read more accurately.

An embodiment of the invention is illustrated in the accompanying drawings in which:

Fig. 4 is a section on the line 4—4 of Fig. 2;

Fig. 4a is a view of the wheel and disc looking at the edge of the disc and the face of the wheel opposite that seen in Fig. 4; and Fig. 5 is a section on the line 5—5 of Fig. 2.

Figure 1:
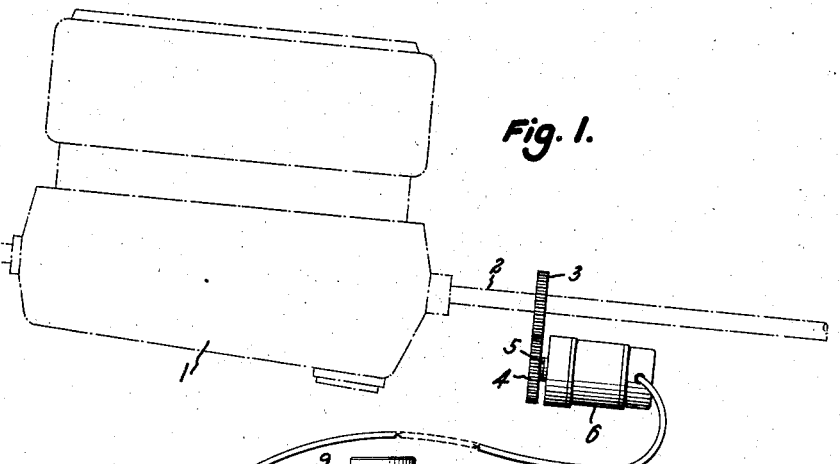
Fig. 1 is a top plan view of the speed indicator connected to the shaft of a motor the speed of which is to be determined.
Figure 2:
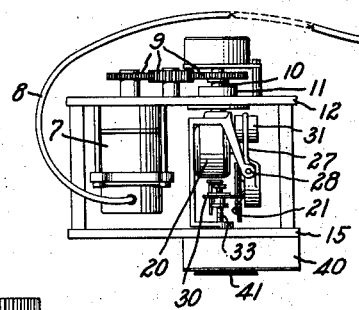
Fig. 2 is an enlarged plan view with parts in section of the speed indicator looking at the edges of the wheel and disc.
Figure 2:
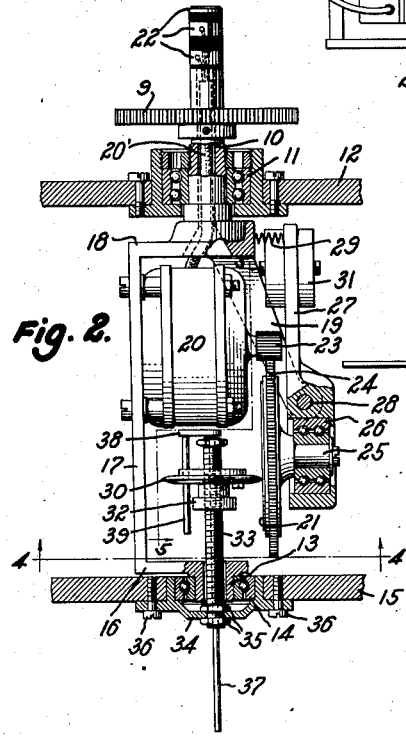
Figure 3:
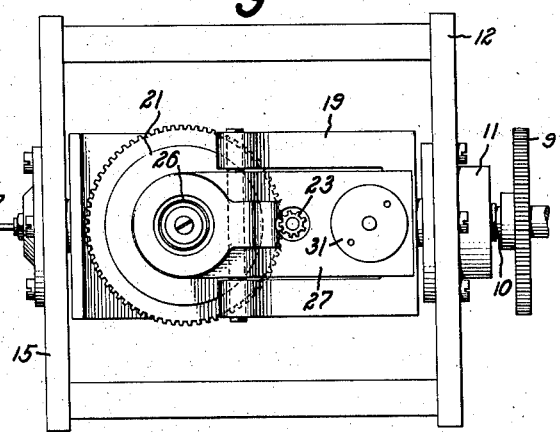
Fig. 3 is an end view of the speed indicator looking at the rear face of the disc.

Referring to the drawings, 1 represents any motor such as an automobile or airplane or marine motor and 2 is the crank shaft of the motor the speed of which is to be measured and indicated. Shaft 2 carries the pinion 3 which meshes with and drives pinion 4 on the rotatable shaft 5 of the Selsyn device 6. Selsyn device 6 is connected through the electrictal conductors 8 to the Selsyn device 7 which drives the shaft 10 of the speed indicator through the gear train 9. It will be understood that parts 1 to 9 inclusive described above form no part of the present invention but merely represent typical means for transmitting the rotary motion of a shaft or the like to be measured to the shaft 10 of the speed indicator.

The wheel and disc mechanism comprises the stub shaft 10 carried by the ball bearing 11 on the frame member 12 and the stub shaft 13 carried by the ball bearing 14 in the frame member 15. The two stub shafts 10 and 13 carry between them the rigid structure 16, 17, 18, 19 upon which are mounted, for rotation therewith, the synchronous motor 20 and the disc 21. Motor 20 is powered by current delivered to it by way of electrical conductors 20' which pass through a bore in the shaft 10 and connect with the slip ring assembly 22 which in turn is supplied with alternating current from a source (not shown) of constant frequency. The shaft of the motor 20 carries the pinion 23 which meshes with the ring gear 24 on the disc 21 so that this disc may be driven at a predetermined constant speed independently of the rotation of the structure 16, 17, 18, 19. Disc 21 is carried by its stub shaft 25 in the ball bearing 26 in the lever member 27 which is pivoted at 28 to the frame part 19. Springs 29 between the frame part 18 and one end of the lever member 27 serve to tilt the lever member 27 and hold the disc 21 against the wheel 30. The frame 16, 17, 18 and 19 and the parts carried by it, i. e. motor 20, disc 21 and lever member 27, are balanced so that the center of gravity thereof is as near as possible to the axis of the stub shafts 10 and 13 and the disc 21 is counterbalanced on the lever member 27 by the weight 31.

Wheel 30 is carried by the nut 32 on the screw shaft 33 which extends through a central opening in the stub shaft 13. The screw shaft 33 is positioned in its mounting by any suitable means such as cup 34 and the nuts 35. Cup 34 is secured to the frame member 15 by set screws 36. Rod 37 extends through a bore in the screw shaft 33 and carries the crank arm 38 and rod 39 which extends through the opening 30' in the wheel 30. The forward end of rod 37 connects directly or through suitable gears (not shown) within the case 40 to the speed indicator hand 41.

In operation, the disc 21 is rotated on its shaft 25 at a predetermined constant speed by the motor 20 and the frame 16, 17, 18, 19 is rotated on its shafts 10 and 13 by the Selsyn device 7 at a speed corresponding to the speed of the shaft 2. The rotation of disc 21 on its axis and its revolution around the wheel 30 cause the wheel to turn on its screw shaft 33 until it reaches a position at which the disc simply rolls around the wheel and the latter remains stationary. The movement of wheel 30 in arriving at this position is transmitted through the rod 39, crank 38 and rod 37 to the speed indicator 41. Springs 29 maintain pressure contact between the wheel and disc. Thus it will be seen that the power transmitted to the wheel 30 through its frictional engagement with the disc 21 is used to turn the wheel 30 on the screw shaft 33 and to turn the crank and rod assembly 37, 38, 39 and such gearing as may be interposed between the rod 37 and the hand or pointer 41. This power or motion transmitting mechanism is light in weight, free of parts which move relative to each other at high speeds, free of parts which tend to cock and bind, and relatively free of connections which have or may develop lost motion and result in inaccuracy of readings. It has been found that the pressure between the disc and wheel may be relatively light and well within the breakdown limits of the wheel edge and the disc surface so that these parts may be expected to continue in service almost indefinitely without failure or appreciable inaccuracy due to gradual wear or chipping, and that in spite of this relatively light pressure between the wheel and disc enough power is delivered to give accurate readings under adverse conditions of extreme heat and cold, presence of dust, etc., and to permit the hand or pointer to be geared up to increase the accuracy with which the pointer indications may be read and even to operate a Selsyn device which may serve to operate a plurality of Selsyn controlled indicators at different locations.

The invention has been described above, for the purpose of illustration, as embodied in a speed indicator, but I wish to point out that the invention is not limited to this embodiment excepting as defined in the appended claims. In its broader aspect, the invention resides in a wheel and disc mechanism in which the wheel is carried on a stationary threaded shaft and the disc is mounted for rotation about its axis and for revolution about the axis of the wheel with its face in contact with the wheel regardless of whether the rotation of the disc or its revolution around the wheel or both are constant or variable, and regardless of the use which is made of the resulting movement of the wheel on its shaft. The invention also embraces the combination with the wheel and disc mechanism having a stationary wheel shaft of simple crank mechanism, the use of which is rendered feasible by the fact that the wheel shaft is stationary, for transmitting the motion of the wheel. It is noted that in addition to the use of this mechanism in a speed indicaor, it might be used to operate a speed recorder or to operate control mechanism such as mechanism for controlling the speed of the motor 1. It might be used to record variation of speed with time and thus to give an indication from which acceleration could be determined. As will be apparent, the disc could be rotated on its axis at a variable speed and revolved about the wheel at a constant speed, or both of these motions might be either constant or variable. Other methods of operating the wheel and disc mechanism and other uses of the resultant relative movement of the wheel and disc will occur to those skilled in this art and all such methods and uses are within the purview of my invention.

It will be appreciated that the rotary movement of the wheel 30 on the screw shaft 33 is proportional to its longitudinal movement on the shaft and that the latter movement might be transmitted to the indicator and serve as a measure of the speed to be determined. It follows that screw threads on the shaft 33 of any desired pitch may be used. It will be appreciated also that while the apparatus illustrated is designed to permit the wheel 30 to move only from the center of the disc 21 to its periphery in one direction, the apparatus may be designed to permit movement of the wheel 30 all the way across the disc 21 and thus to indicate both positive and negative speeds.

It will be appreciated further that parts 16 and 17 of the frame and the bearing 13 may be omitted and the motor 20 and disc 21 mounted on frame parts 18 and 19 rotated on the single bearing 19, since parts 16 and 17 and bearing 13 serve merely further to support the rotating structure.

Such modifications of the apparatus specifically disclosed and others within the skill of a person skilled in this art are embraced by my invention, the essence of which is the mounting of the disc so that it may be rotated on its axis at one speed and revolved about the axis of the wheel at another speed thereby permitting the wheel to be carried on a stationary shaft and to remain stationary excepting for its rotation about and movement along said shaft.

I claim:

1. In combination, a stationary screw shaft, a wheel threaded to run on said shaft, a first rotatable shaft the axis of which coincides with the axis of the stationary shaft, a second rotatable shaft carried by said first rotatable shaft with its axis intersecting the axis of said first rotatable shaft, a disc on said second rotatable shaft positioned so that its face engages the edge of the wheel, means for rotating said disc about the axis of said second rotatable shaft and means for revolving said second rotatable shaft about the axis of said first rotatable shaft.

2. Wheel and disc apparatus comprising a stationary screw shaft, a wheel threaded to run on said screw shaft, the plane of the edge of said wheel being perpendicular to the axis of said stationary shaft, a rotatable shaft the axis of which coincides with the axis of the stationary shaft, means for rotating said rotatable shaft on its axis, a disc carried by said rotatable shaft and revolvable therewith about the axis of said rotatable shaft, the face of said disc being positioned in frictional contact with the edge of said wheel, means carried by said rotatable shaft for rotating said disc about its axis, and means for transmitting the movement of said wheel on said stationary screw shaft.

3. Wheel and disc apparatus as defined in claim 2 in which the means carried by the rotatable shaft for rotating the disc about its axis comprises a motor carried by the rotatable shaft and revolvable therewith around the axis of said rotatable shaft, said motor being mechanically connected to rotate the disc on its axis.

4. Wheel and disc apparatus as defined in claim 2 comprising a rigid member rigidly connected to the rotatable shaft and revolvable therewith around the axis of said rotatable shaft, a lever member pivotally mounted on said rigid member, said lever member supporting the disc, and flexible means tending to move said lever member about its pivotal connection to hold said disc in frictional contact with the wheel.

5. Wheel and disc apparatus as defined in claim 2 comprising an axial bore in the stationary screw shaft, an opening in the wheel and a rigid crank member having one arm extending through said bore and another arm extending through said opening, said crank member serving to transmit rotary movement of said wheel on said stationary screw shaft through the bore in said shaft.

6. In a disc and wheel mechanism, a stationary screw shaft, a friction wheel threaded to run on said shaft with the plane of its edge perpendicular to the axis of the shaft, an axial bore through said shaft, an off-center opening in said wheel, a rod extending through the bore in said shaft, a second rod spaced from and parallel to said first named rod, said second rod extending through said off-center opening in said wheel, and an arm rigidly connecting an end of each of said rods.

7. In a disc and wheel mechanism, a rotatable shaft, a rigid frame carried by said shaft and revolvable therewith, a lever member pivotally mounted on said frame, a disc mounted on one end of said lever member to rotate on an axis intersecting the axis of said rotatable shaft, a flexible means bearing between said frame and said lever member tending to urge the end of said lever member bearing said disc toward the axis of said rotatable shaft and a motor mounted on said frame and connected to rotate said disc.

8. In combination; a shaft rotatable on a fixed axis, means for rotating said shaft, a rigid frame carried by said shaft and revolvable therewith, a lever member pivoted to said frame, a disc mounted on one end of said lever member to rotate on an axis intersecting said shaft and perpendicular to the plane face of said disc, flexible means bearing against said frame and said lever member tending to urge the end of said lever member bearing said disc toward the axis of said shaft, a motor mounted on said frame connected to rotate said disc on its axis, electrical conductors extending from slip rings on said shaft through a bore therein to said motor, a stationary screw shaft the axis of which coincides with the axis of said rotatable shaft, a wheel threaded to run on said screw shaft, said wheel and said disc being so positioned that the edge of the wheel frictionally engages the face of the disc, an axial bore through said stationary threaded shaft, an off-center opening in said wheel, parallel rods extending through said bore and said opening, an end of each of said rods being rigidly connected.

9. Wheel and disc apparatus comprising a screw shaft, a friction wheel threaded to run on said screw shaft, a friction disc rotatably supported with its face in contact with the edge of the wheel, means for rotating said disc on its axis and means for revolving the disc about the axis of the wheel.

SAM HAMILTON.